Sept. 26, 1933.          G. R. BLAKESLEY          1,928,305
AUTOMOBILE PARKING DEVICE
Filed May 14, 1932          2 Sheets-Sheet 1
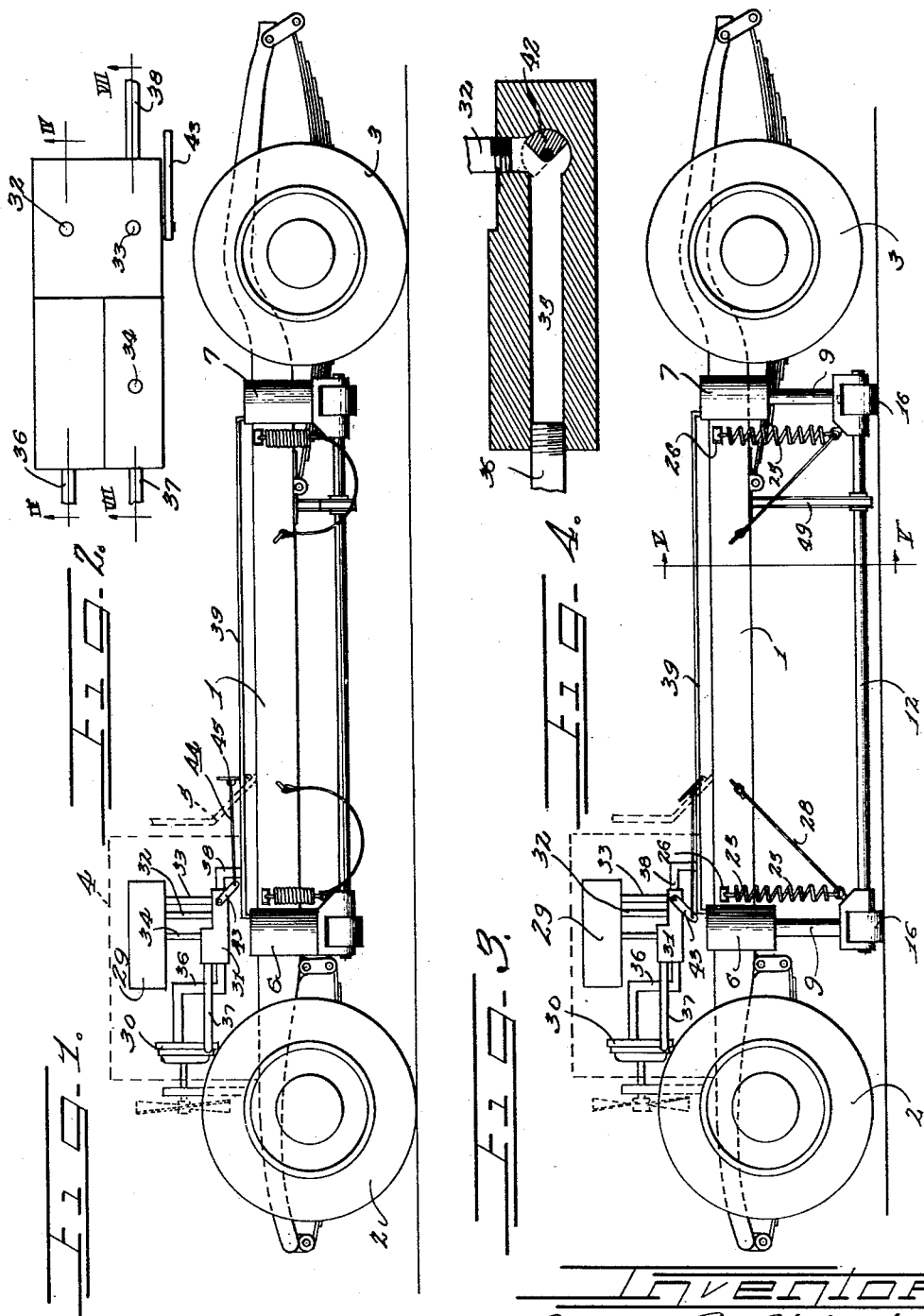
Inventor
George R. Blakesley.
by: Charles Hill
Attys.

Sept. 26, 1933.  G. R. BLAKESLEY  1,928,305
AUTOMOBILE PARKING DEVICE
Filed May 14, 1932  2 Sheets-Sheet 2
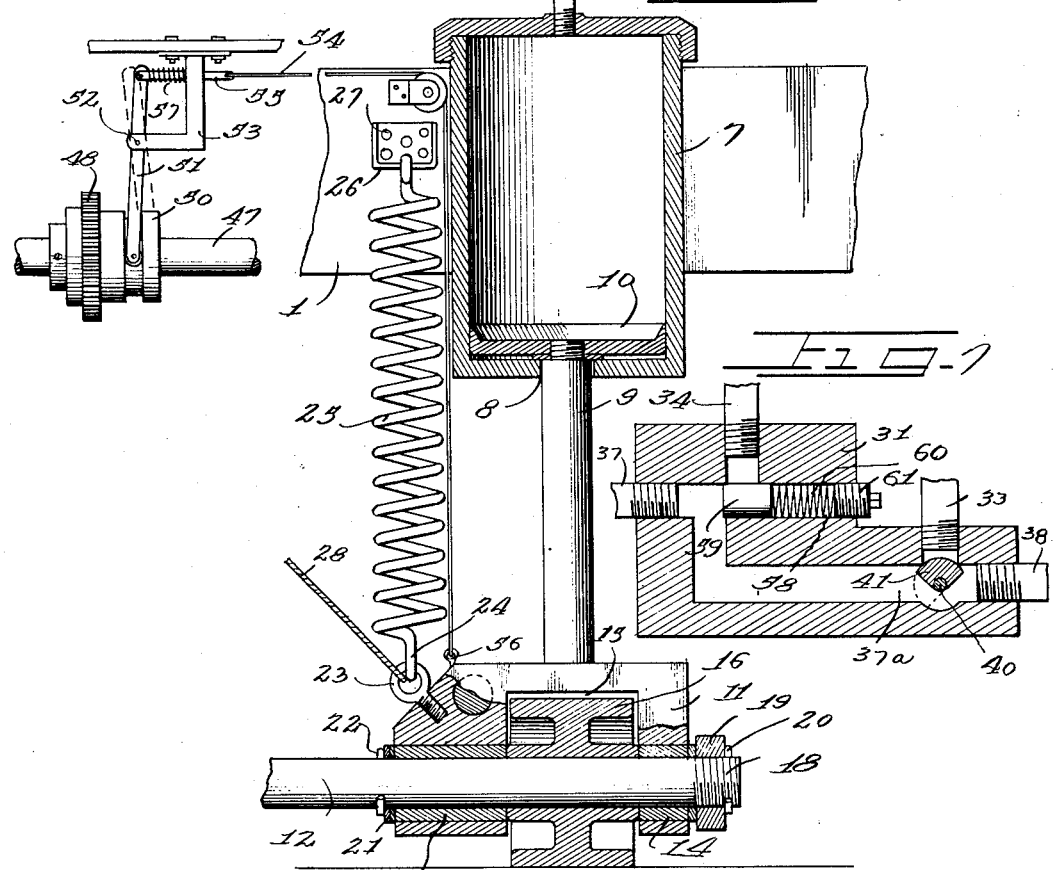
Inventor
George R. Blakesley.
by Charles Hill
Attys.

Patented Sept. 26, 1933

1,928,305

UNITED STATES PATENT OFFICE 1,928,305

AUTOMOBILE PARKING DEVICE

George R. Blakesley, Noel, Mo.

Application May 14, 1932. Serial No. 611,308

2 Claims. (Cl. 180—1)

The present invention relates to an automobile parking device and more especially to apparatus affixed to an automotive vehicle which device has auxiliary wheels or rollers operating at substantially right angles to the vehicle wheels whereby the vehicle may be moved to the right or left without imparting forward or backward movement to the vehicle for parking or other purposes.

An object of the present invention is to provide means for moving an automotive vehicle sideways without causing forward or backward movement of the vehicle.

Another object of the invention is to provide auxiliary wheels for an automobile effective as desired to cause movement of the automobile at right angles to normal forward and backward movement of the same for parking or other purposes.

A further object of the invention is to provide an attachment for an automobile including auxiliary wheels normally maintained above the grade surface which wheels may be lowered as desired to raise the automobile wheels from the grade surface for tire changing purposes or for moving the vehicle sideways for parking purposes.

A still further object of the invention is to provide power actuated auxiliary wheels for automotive vehicle and jacks for lowering said auxiliary wheel whereby to raise the automobile wheels from the grade surface and impart lateral movement to the vehicle while so raised.

The above, other and further objects of the invention will be apparent from the following description, accompanying drawings and appended claims.

The accompanying drawings are schematic in character and they together with the description thereof are not to be construed in any sense as limiting the present invention.

The views of the accompanying drawings are as follows:

Figure 1 is a diagrammatic side elevational view of an automobile frame showing applied thereto apparatus embodying principles of the present invention.

Figure 2 is a top plan view of the illustrated form of a control valve for actuating the jack constructed in accordance with principles of the present invention.

Figure 3 is a view similar to Figure 1 with the jack extended and the vehicle raised from the grade surface.

Figure 4 is a sectional view taken substantially in the plane of line IV—IV of Figure 2.

Figure 5 is a sectional view taken substantially in the plane of line V—V of Figure 4.

Figure 6 is an enlarged vertical sectional view taken through the illustrated form of jack and showing its related plunger and auxiliary wheel, certain portions being shown in section and certain portions are broken away to show details of construction.

Figure 7 is a sectional view taken substantially in the plane of line VII—VII of Figure 2.

The drawings will now be explained.

Figure 1 indicates schematically frame 1 of conventional form of an automotive vehicle. Its front wheels 2 and rear wheels 3 are shown conventionally and in dotted lines at 4 is indicated power plant for the motor vehicle. A portion of the floor is indicated at 5 with a part of the dash rising from the floor.

Attached to the vehicle frame 1 in any suitable manner are cylinders 6 and 7 disposed on the left side of the frame 1 and illustrated in the drawings. On the other side of the frame are similar cylinders. Cylinders are secured to the frame in any suitable manner as may be desired and as the construction of the vehicle frame warrants.

Figure 6 illustrates a section of a cylinder 7 having its lower end apertured at 8 through which passes a plunger or piston rod 9 having its inner or upper end secured to a piston or head 10 within the cylinder and subject to fluid pressure in such cylinder. The lower end of the plunger 9 as well as of the other plungers movable by the fluid pressure within the cylinder is supplied with a casting 11 through which extends a shaft 12. The casting 11 is provided with bushings 13 and 14 and is formed to provide a recess 15 within which rotates an auxiliary wheel or roller 16. The wheels or rollers 16 are keyed or otherwise fastened to the shaft 12 so as to be driven by the same. The ends of the shaft are threaded at 18 and nuts 19 are threaded onto the ends of the shaft for adjusting the shaft in the casting 11. Cotter pins 20 may be employed to prevent dislodgment of the nuts 19 in service.

The washer 21 is arranged about the shaft 12 against the bushing 13 being retained by a cotter pin 22 or other equivalent means. An eye or similar element 23 is secured to or formed as a part of a casting 11 and has engaged therewith one end 24 of a spring 25, the other end of which engages a bracket 26 suitably fastened to the frame 1 by rivets 27 or equivalent fastening means.

Also attached to the eye 23 is a guy 28 the other end of which is fastened to an eye or hook secured to the frame 1. The purpose of the guy 28 is to brace the rollers and shafts when the plungers 9 are projected as will be later explained.

The shaft 12 on one side of the machine such for instance as the left side illustrated in Figures 1 and 3 connects the rollers 16 on this side of the machine while a shaft on the other side of the machine connects the rollers on that side of the vehicle.

The action of the spring 25 is to normally maintain the shafts 12 and the connected rollers and castings in upward or retracted position, that is, in the position shown in Figure 1 and Figure 5.

Carried by the vehicle is a fluid reservoir 29 which contains a supply of suitable fluid for actuating plungers 9. A pressure pump 30 is connected to such portion of the power plant 4 of the vehicle as will operate the pump when desired. This connection may be by chain from the crank shaft or by gearing or if desired the pump 30 might be disposed as to be driven from the fly wheel of the automobile engine or likewise might be driven by belt if so desired.

A valve chamber 31 communicates with the reservoir 29 through a plurality of pipes 32, 33 and 34. The valve chamber 31 is provided with a passage 35 into one end of which is connected the pipe 32 and in the other end of which a pipe 36 leads to the intake side of the pump 30. The valve chamber 31 is provided also with another passage 37 which as illustrated in Figure 7 is substantially V-shaped and is provided with a plurality of openings.

The passage 37 is connected by means of the pipe 33 to the reservoir 29. Another opening is connected by pipe 34 to the reservoir 29. Still another outlet or opening is connected by a pipe 37 to the outlet side of the pump 30. Leading from the passage 37a in the valve structure 31 is a pipe 38 which communicates with a pipe 39 connected to the cylinders for supplying fluid pressure to the same.

A shaft 40 extends transversely of the valve structure 31 and carries valves 41 and 42 for controlling communication between the pipe 33 and the passage 37 at one side of the valve structure and between the pipe 32 and the passage 35 of the other side of the valve structure. The valves 41 and 42 are made as segments and are operable from full line to dotted line positions of Figures 3 and 7. A lever 43 is connected to the shaft 40 and at the other end is connected to a link 44 which in turn is connected to a lever 45 suitably disposed for actuation by the operator of the vehicle. The lever 45 may be disposed near the floor for actuation by a foot of the operator or might be disposed on the dash for hand operation as desired. One of the shafts 12 is, in the accompanying drawings, shown as provided with a sprocket wheel 46 and the propeller shaft 47 is provided with sprocket wheel 48. A sprocket chain 49 connects the sprocket wheels 46 and 48 for rotating the connected shaft 12 as the propeller shaft 47 is rotated in a manner to be hereinafter explained.

The sprocket wheel 48 on the propeller shaft 47 is connected to and disconnected from driving relation with the propeller shaft 47 by means of a sliding clutch designated generally at 50 which is actuated by an arm 51 pivoted at 52 to a bracket 53 depending from the frame structure of the vehicle. A flexible connector such as a cable 54 is connected to a link 55 at one end and at the other end is connected to an eye 56 fastened to one of the castings or housings 11. A spring 57 surrounds the link 55 and bears against the bracket 53 to normally maintain the clutch 50 out of clutching engagement between the sprocket wheel 48 and the propeller shaft 47 and it maintains the arm 51 in dotted line position of Figure 6. When the plungers on the supported rollers and shafts are in raised or normally inoperative position sprocket chain 49 sags but when the rollers and shafts are lowered to operative position such as that shown in Figures 3 and 6 the chain is taut for properly driving the rollers in the desired direction. In like manner the guys 28 are loose when the rollers and shafts are raised but are taut when the parts are lowered.

Within the valve structure 31 is a passageway 58 in line with the connection to the pipe 37. A valve 59 is disposed in this passageway and is normally maintained in position to close communication with the pipe 34 by means of a spring 60 which is retained in position and adjusted by a threaded cap 61 engaging the passageway 58.

The valves 41 and 42 are shown in full lines in open position and in dotted lines in closed position.

The arrangement of the links 43, 44 and lever 45 in Figure 1 is the position assumed by these parts when the rollers or auxiliary wheels and shafts are in raised or normal inoperative position and in Figure 3 are shown as the same appear when actuated to lower the auxiliary wheels.

When it is desired to raise the vehicle from the grade surface for changing tires or for parking purposes the lever 45 is moved from the full line position in Figure 1 to the full line position of Figure 3 thereupon opening valve 42 to admit fluid from the reservoir 29 to the pipe 32 then to the pipe 36 to the pump 30. The pump is placed in operation by suitable connections for creating pressure on the contained fluid. Such fluid under pressure leaves the pump 30 through the pipe 37 and enters the passage 37 and passes out through the pipe 38 to the pipe 39 communicating with the cylinders 6 and 7 thereupon moving the pistons or heads 10 downwardly thus projecting the plungers 9 to lower the rollers 16 against the grade surface. Continued movement is such as to elevate the vehicle above the grade surface as shown in Figure 3. The extent of upward movement of the vehicle is limited by the guys 28 becoming taut. When this condition is reached any further action of the pump 30 will create pressure within the passage 37 to open the valve 59 and thus return to the reservoir or tank 29 such fluid under pressure. At this point the operator may if he choose stop the operation of the pump. The vehicle has by this time been elevated or raised from the grade surface to the position shown in Figure 3. If it is desired to change a tire this may be readily accomplished in the usual manner.

Should it be desired to move the vehicle sideways for parking purposes then the propeller shaft 47 is caused to rotate in the direction to drive the vehicle forward. Lowering of the roller 16 and the shaft 12 through the instrumentality of the cable 54 clutches the sprocket wheel 48 to the propeller shaft 47 so that when the propeller shaft 47 is driven in direction to advance the vehicle it will rotate the shaft 12 in a direction to move the vehicle say to the right. When it is desired to move the vehicle to the left then the gear shift lever is actuated to place the gear in position for reverse drive of the propeller shaft whereupon rotation of the connected shaft 12 by the sprocket chain 49 will be in the opposite direction.

As long as the lever 45 is depressed, the plungers 9 will be projected thus maintaining the vehicle in raised position. As soon as it is desired to lower the vehicle the lever 45 is released whereupon the valves 41 and 42 are moved to closed position and the springs 25 thereupon become effective to raise the plungers 9 and the attached rollers and shafts to elevated or inoperative position as shown in Figure 1.

The present invention is useful in connection with parking of vehicles in crowded spaces. Oftentimes the driver of a vehicle finds a parking space large enough for the length of his vehicle but not sufficient to allow backing into such space or driving into such space in a forward direction. In such event he would come along side of said space, project the rollers 16 and then actuate the propeller shaft 47 in a direction to move the vehicle sideways into the parking space and when the vehicle had been properly parked release the pressure whereupon the rollers would be raised out of elevating position and the vehicle would then rest with its wheels on the grade surface.

The pump 30 may be driven in any convenient and suitable manner, such for instance, by an electric motor similar to the starting motor.

Any suitable means may be employed for operating the jacks other than those mentioned. Screw or lever jacks might be used, as well as air-jacks.

Power may be transmitted to the shafts 12 by belt and pulley arrangement, flexible shaft and by rigid shafts and gears, as well as by the described sprocket chain drive.

The springs 25 for retracting the shafts 12 and rollers 16 might be replaced by lever or other suitable actuating means. The cylinders 7 might be hinged to the frame 1 for hinging movement into and out of operative position.

Closing the valves 41 and 42 cuts off the supply of fluid to the pump 30 and opens fluid passage to the reservoir 29 so that the fluid in the cylinders 7 may return to the reservoir.

The elevating apparatus is suitably cross-braced for strength.

The pistons or heads 10 have deep peripheral flanges to prevent side play of the plunger or piston rods 9.

The invention has been described herein more or less precisely as to details, but it is to be understood that the invention is not limited thereby as changes may be made in the construction and arrangements of parts, and equivalents may be substituted, without departing from the spirit and scope of the invention.

The invention is claimed as follows:

1. A motor vehicle, a plurality of cylinders attached to the frame thereof on both sides of the vehicle, plungers in said cylinders movable vertically thru the lower ends of said cylinders, fluid pressure means on said vehicle, connections between said fluid pressure means and said cylinders, means controlling flow of fluid pressure to said cylinders, and spring means for normally maintaining said plungers in retracted position, admission of fluid pressure to said cylinders projecting said plungers downwardly against the grade surface to raise the vehicle from the grade surface, said plungers having rollers at their lower ends, a shaft along one side of the vehicle connected to the rollers on that side of the vehicle, another shaft along the other side of the vehicle and connected to the rollers on that side of the vehicle, the shafts and the roller axes extending in the direction of the length of the vehicle, and connections including a clutch between a shaft and the vehicle power plant for driving said rollers to move the vehicle sideways, spring means for normally maintaining said clutch in inoperative position, and means responsive to the lowering of the rollers for actuating said clutch in opposition to said spring means for connecting said shaft in driving relation with the vehicle driving mechanism.

2. In combination with a motor vehicle of means for raising the wheels thereof from a grade surface and moving the vehicle sideways, said means including air cylinders, plungers within said cylinders carrying ground wheels at their ends, springs for maintaining said plungers in elevated position and for raising said plungers after air pressure is relieved in said cylinders, means for admitting air under pressure to said cylinders for projecting said plungers, shafts connecting said ground wheels longitudinally of the vehicle, connections between said shafts and vehicle power plant for rotating said ground wheels to move the vehicle sideways, cables for limiting the downward movement of said ground wheels, and means including a clutch for connecting said ground wheels in driving relation with the vehicle power plant when said plungers have been projected to points limited by said cables, spring means for normally maintaining said clutch in inoperative position, and means effective when said ground wheels have been lowered to points limited by said cables for actuating said clutch in opposition to said spring to connect said ground wheels in driving relation with the vehicle power plant.

GEORGE R. BLAKESLEY.